United States Patent [19]

Kim

[11] Patent Number: 5,023,862
[45] Date of Patent: Jun. 11, 1991

[54] APPARATUS FOR LOCKING A PICKUP UNIT OF A DISC PLAYER FOR A VEHICLE

[75] Inventor: Ko-Hyun Kim, Suweon, Rep. of Korea

[73] Assignee: SamSung Electronics Co., Ltd., Suweon, Rep. of Korea

[21] Appl. No.: 538,004

[22] Filed: Jun. 14, 1990

[30] Foreign Application Priority Data

Dec. 4, 1989 [KR] Rep. of Korea ............... 89-17848

[51] Int. Cl.$^5$ .................. G11B 21/02; G11B 17/00
[52] U.S. Cl. .................... 369/215; 369/219; 369/244
[58] Field of Search ............ 369/215, 219, 244, 77.1, 369/77.2, 247, 263; 360/104, 105, 106

[56] References Cited

U.S. PATENT DOCUMENTS

| 4,695,996 | 9/1987  | Sugihara et al. | 369/247 |
| 4,717,978 | 1/1988  | Ichinose        | 360/106 |
| 4,750,068 | 6/1988  | Akasaki et al.  | 360/106 |
| 4,788,677 | 11/1988 | Ikedo et al.    | 369/215 |
| 4,796,130 | 1/1989  | Shimanuki       | 360/105 |
| 4,831,615 | 5/1989  | Goto et al.     | 369/219 |
| 4,899,328 | 2/1990  | Ishii et al.    | 369/244 |
| 4,974,222 | 11/1990 | Ishitoya et al. | 369/244 |

Primary Examiner—Stuart S. Levy
Assistant Examiner—Tan Nguyen
Attorney, Agent, or Firm—Robert E. Bushnell

[57] ABSTRACT

An apparatus for locking a pickup unit of a disc player for vehicles comprises a pivotal segment for pivoting by a shoulder formed at a part of the pickup unit, a first lever provided with a threaded hole for engaging with a driving thread part formed at the end portion of the threaded rod a second lever and a third lever in turn interlocking by the first lever, and three lockers for engaging with the slots, respectively, formed at the main chassis and interlocking to said three levers. The pickup unit may be moved along a threaded rod driven by motor mounted on a base plate and said first lever is moved by the movement of the pivotal segment.

11 Claims, 4 Drawing Sheets

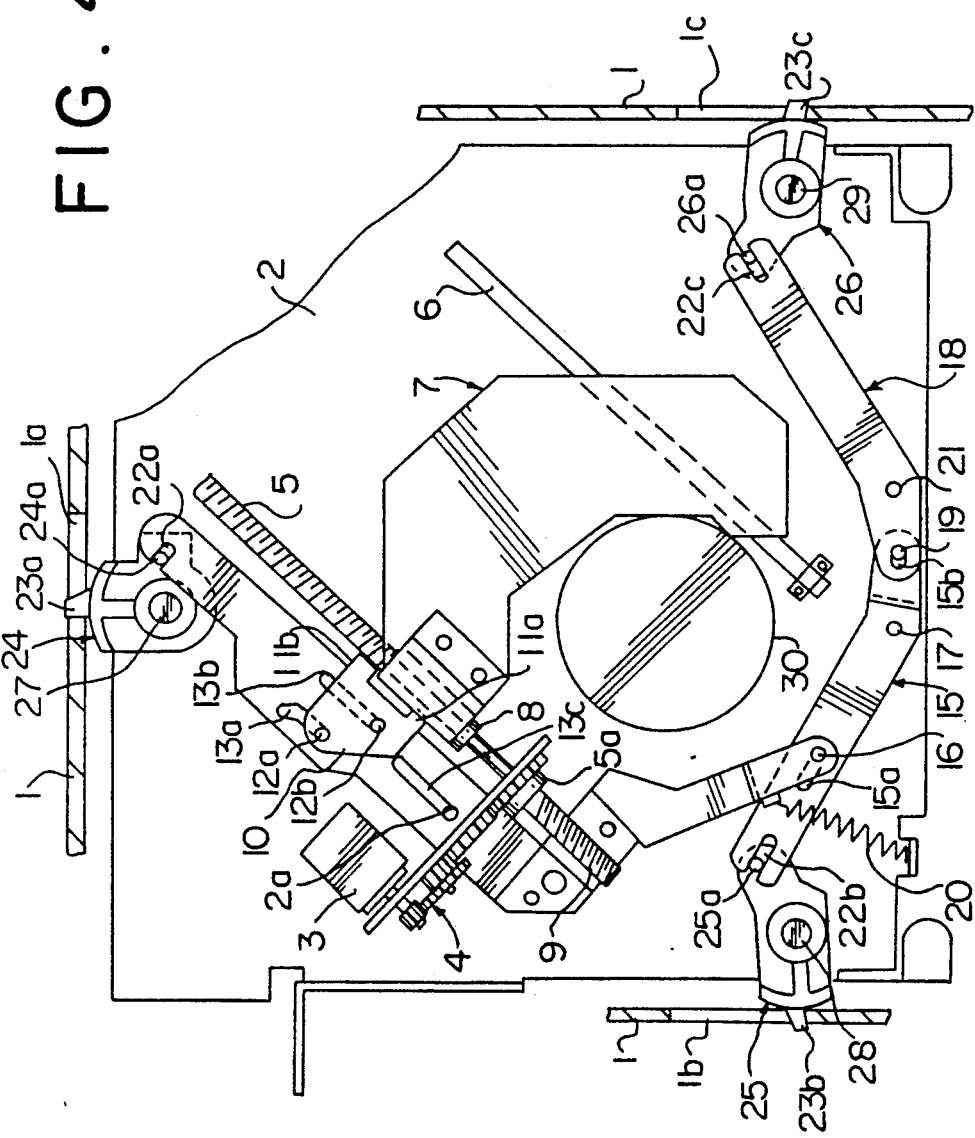

APPARATUS FOR LOCKING A PICKUP UNIT OF A DISC PLAYER FOR A VEHICLE

BACKGROUND OF THE INVENTION

This invention relates to a disc player for a vehicle, and particularly to an apparatus for absorbing vibrations of a pickup unit during the operation of the player and for locking the pickup unit in the main chassis of the player to prevent the pickup from rattling after completing the operation of the player.

Generally, disc players have become in use for vehicles since the sound quality of the disc is better than that of the tape. However, there were some problems such as vibrations and rattling of the pickup unit, which should be minimized in operation thereof. Despite the continuous efforts for resolving such problems, sufficient results have not yet obtained.

SUMMARY OF THE INVENTION

An object of this invention is to provide an apparatus for locking a pickup unit device of a disc player for a vehicle to protect the pickup unit from the vibrations and impacts of the vehicle and thereby to accurately reproduce sound from the disk.

To accomplish the above object, there is provided an apparatus for locking a pickup unit comprising a pivotal segment for pivoting by a shoulder formed at a portion of the pickup unit which is movable along a threaded rod being driven by a motor mounted on a base plate; a first lever being moved by said pivotal segment and engaged with a driving thread part formed at the end portion of the threaded rod; a second lever and a third lever in turn being interlocked by said first lever; first, second and third lockers for engaging with each corresponding slot formed at a main chassis and interlocking with each of said three levers.

BRIEF DESCRIPTION OF THE DRAWINGS

These and other objects, features and advantages of the invention will become more apparent to those skilled in the art upon reference to the accompaying specification, claims, and drawings in which:

FIG. 4 is a top plan view showing the pickup unit locked according to the present invention.

DETAILED DESCRIPTION OF THE PREFERRED EMBODIMENT

The present invention will be now described in more detail with the accompanying drawings.

Figure 1:
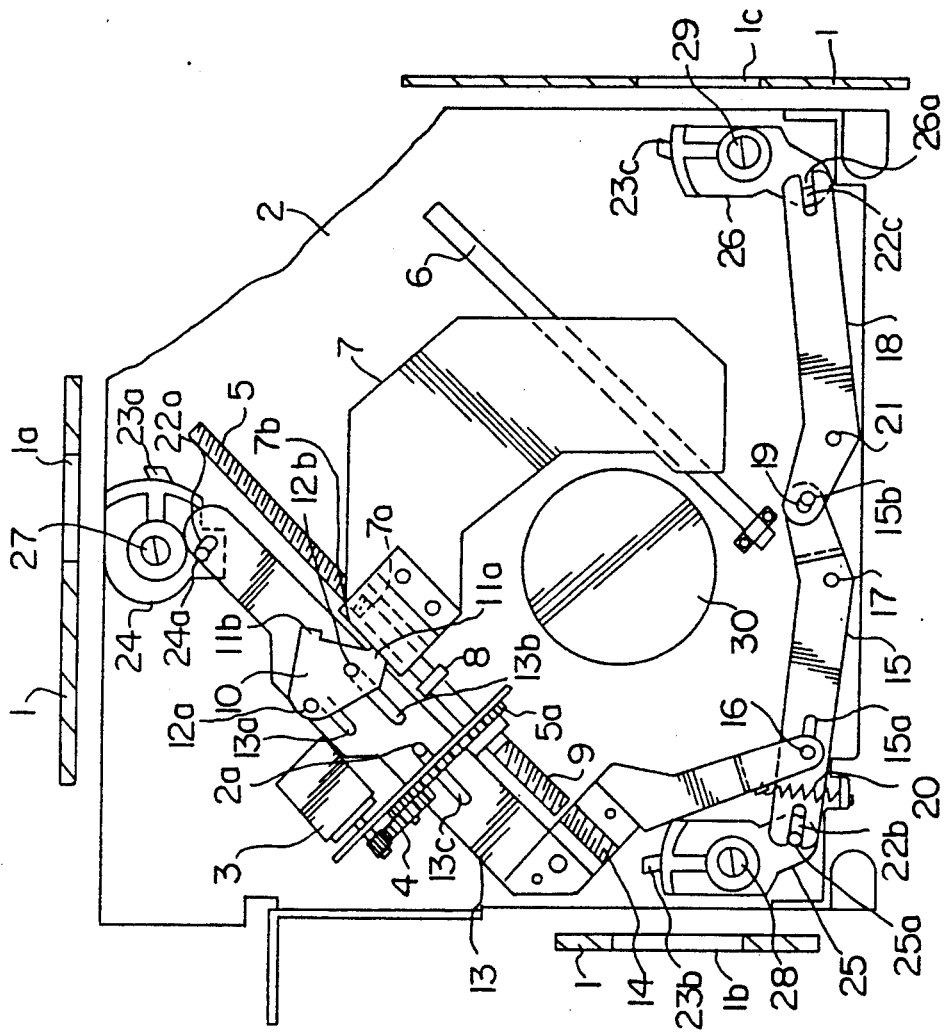
FIG. 1 is a top plan view of an embodiment according to the present invention.
Figure 2:
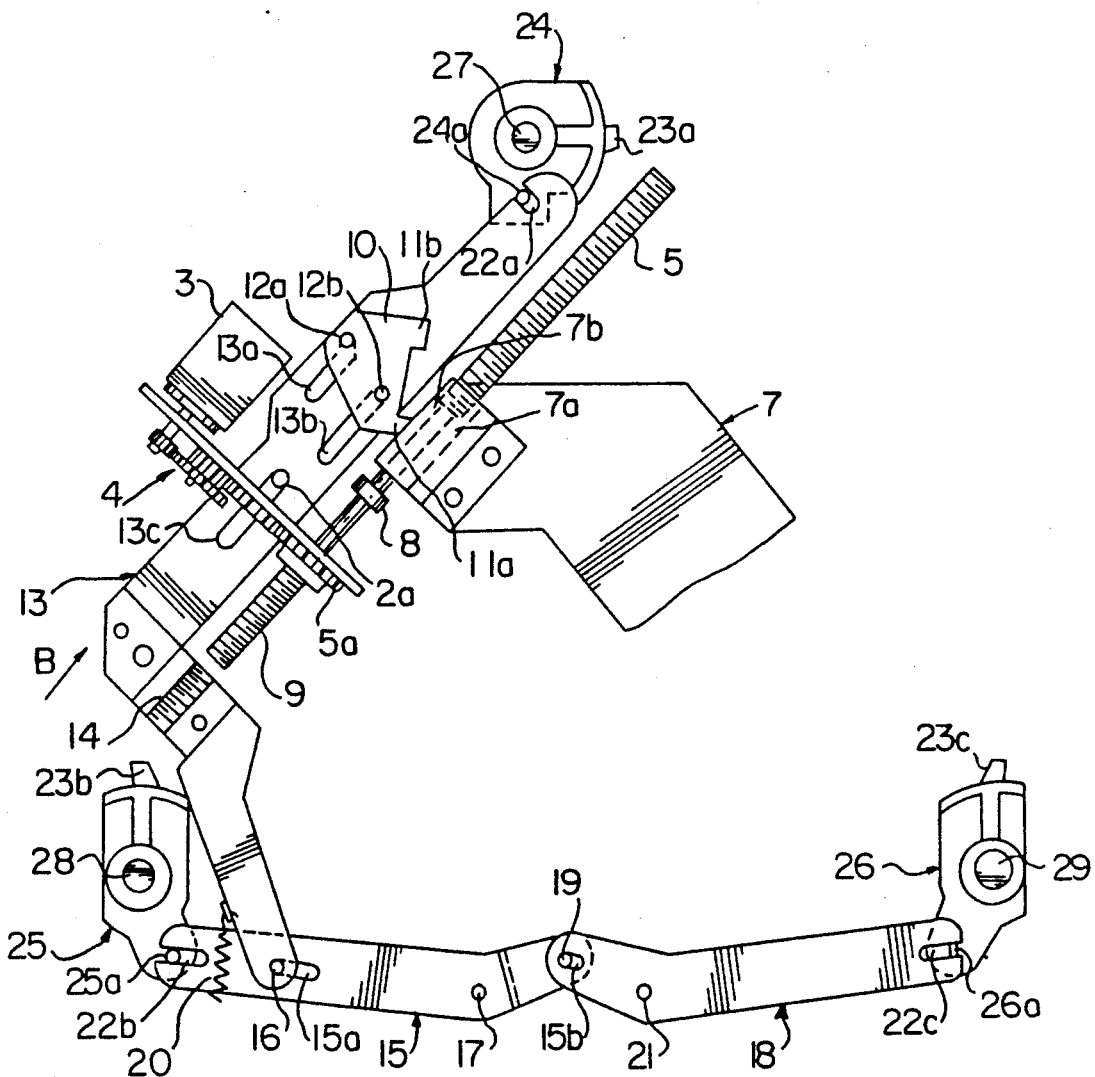
FIG. 2 is a partial view illustrating the operation state of the embodiment according to the present invention.

Referring to FIGS. 1 and 2, a base plate 2 is resiliently mounted on the inside of a main chassis 1 of a disc player, in which locking slots 1a, 1b and 1c are formed. The edges of the base plate 2 are supported by resilient means such as a spring or a damper (not shown).

Motors 3 and 30 also are mounted on the base plate 2. The output of the motor 3 is transmitted to a gear 5a of a threaded rod 5 via a reduction gear part 4 to reduce the rotation velocity of the threaded rod 5. The threaded rod 5 is engaged with a threaded part 7a of a pickup unit 7 so that the pickup unit 7 may reciprocate along the threaded rod 5 and a guide rod 6.

Furthermore, one side of the rod 5 is provided with a stopper 8 for stopping the movement of the pickup unit 7, a gear 5a in mesh with the reduction gear part and a driving threaded part 9 of which threads are formed in the opposite direction with respect to the thread direction of the threaded rod 5. A pivotal segment 10 with two protrusions 11a and 11b is pivotally combined with a first lever 13 in which two long slots 13a and 13b are provided to fit with two pins 12a and 12b, respectively. The pivotal segment 10 may be pivoted by a shoulder 7b of the pickup unit 7 between the stopper 8 and the lower end of the threaded rod 5.

The first lever 13 is provided with another slot 13c for pin connection with the pin 2a formed at the base plate 2 to guide the first lever 13.

The branched part of the first lever 13 provided with a threaded hole 14 at one end portion thereof includes a pin 16 at the other end portion which is slidingly fitted with a long slot 15a at the one portion of the second lever 15. Further, the bottom side of the first lever 13 is connected to the base plate 2 by a spring 20.

The second lever 15 is mounted on the base plate 2 so as to be pivoted on an axis 17, being also provided with a long slot 15b at the other end portion which is connected to one end of the third lever 18 by a pin 19. The third lever 18 is mounted on the base plate 2 to pivot on an axis 21.

Each slot 22a, 22b and 22c is formed at the corresponding end of each of first, second and third levers 13, 15 and 18 and each of three lockers 24, 25 and 26 having each of locking segments 23a, 23b and 23c adjacent to each of locking openings 1a, 1b and 1c is mounted on the base plate 2 so as to pivot on each of axes 27, 28 and 29. Also, each of the lockers 24, 25 and 26 is pin-connected to each of the three levers 13, 15, 18 at each of the slots 22a, 22b and 22c by each of the pins 24a, 25a and 26a.

According to the present invention, the disc player is mounted in the main chassis 1 of the audio mechanism provided at the front of the driver's seat. When the disc player is turned on during the running of the vehicle, as shown in FIG. 1, the rotation velocity of motor 3 mounted on the base plate 2 is reduced by the reduction gear part 4 and the rotation force is transmitted to the threaded rod 5 through the gear 5a which is engaged with the reduction gear part 4. Therefore, the pickup unit 7 in which the threaded rod 5 is engaged with the threaded part 7a may be moved along the threaded rod 5 and the guide rod 6 to exactly follow a track formed on the disc. Under the running condition of the vehicle, the vibrations and impacts affecting the pickup unit 7 may be absorbed and reduced due to the characteristic configuration that the pickup unit 7 being mounted on base plate 2 is resiliently interlocked to the main chassis 1 by springs or dampers(not shown) such that the pickup unit is not affected for following the track on the disc. Therefore, the original sound may be reproduced under the running condition of the vehicle.

Figure 3A:
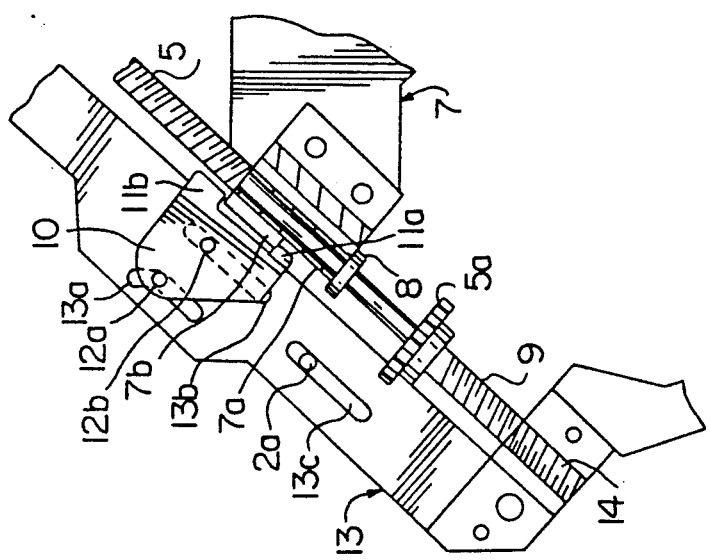
FIGS. 3A and 3B are fragmentary views showing the operating relation of main parts of the embodiment.
Figure 3B:
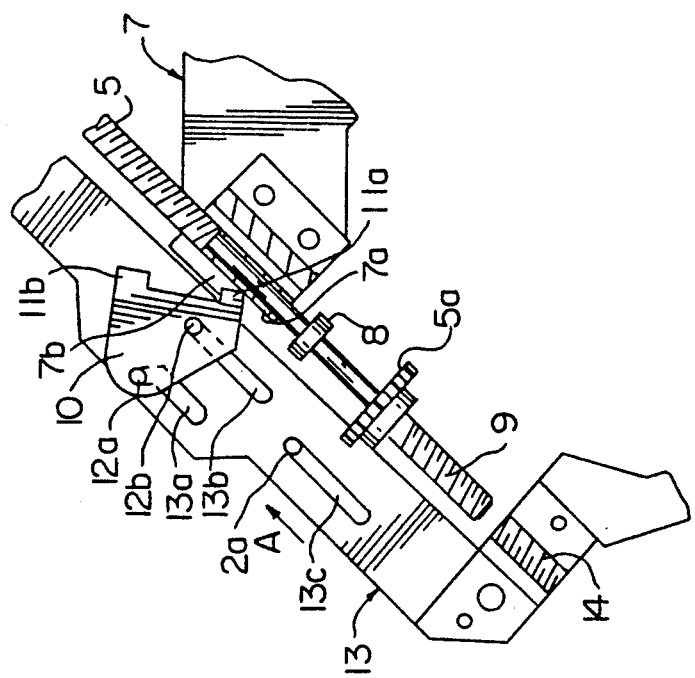

As shown in FIG. 2 to FIG. 4, when the operation of the disc player is stopped, the rotation of motor 3 is reversed by a sensor and the threaded rod 5 which is in turn interlocked to the reduction gear part 4 and the gear 5 is reversely rotated, whereby the pickup unit 7 comes back to the original position along the threaded rod 5. As shown in FIGS. 3A and 3B, the pickup unit 7 is released out of the thread engagement and the shoulder 7a of the pickup unit 7 pushes the protrusion 11a of the pivotal segment 10. Then the pivotal segment 10 is pivoted on the pin 12b and another pin 12a pushes the sidewall of the long slot 13a formed at the first lever 13. Therefore, the first lever 13 is moved in the direction of as indicated by arrow A in FIG. 3A and threaded hole 14 of the first lever 13 is closely contacted with the driving threaded part 9 of the threaded rod 5. The protrusions 11a and 11b of the pivotal segment 10 are fitted with the shoulder 7b of the pickup unit 7 to lock the pickup unit 7 in cooperation with the stopper 8. Thus, the pickup unit 7 is disengaged from the threaded part of the thread rod 5 and stopped.

The continuous rotation of the motor 3 enables the driving threaded part 9 of the rod 5 to engage with the adjacent threaded hole 14. Therefore, as shown in FIG. 2 and FIG. 4, each of the pins 2a, 12a and 12b fixed to the base plate 2 is guided in each of the long slots 13c, 13a and 13b and the first lever 13 is moved in the direction of as indicated by arrow in FIG. 2. The second lever 15 is pivoted on the axis 17 due to the cooperation of the pin 16 and the slot 15a, and the spring 20 which connects the side of the first lever 13 with the base plate 2 is tensioned.

The pivoting of the second lever 15 enables the third lever 18 to pivot on the axis 21 due to the connection of the pin 19 and the slot 15b of the second lever 15.

If the first, second and third levers 13, 15 and 18 are driven, respectively, the lockers 24, 25 and 26 interlock by the engagements of each of the pins 24a, 25a and 26a and each of the slots 22a, 22b and 22c formed at the corresponding end portions of the above levers, each of the locking segments 23a, 23b and 23c is locked in each of the slots 1a, 1b, 1c of the main chassis 1 and the pickup unit 7 and the base plate 2 are thus locked to the main chassis 1. Therefore, the pickup unit 7 under the non-operational condition is tightly fixed to the main chassis 1 and protected from damage and impairment.

According to the present invention, the disc player may reproduce the original sound without damage or impairment by absorbing the vibrations and impacts affecting the pickup unit during the operation of the disc player and by locking the pickup unit and base plate in the main chassis during the non-operation of the disc player. Therefore, the problems according to the installation of the disc player in vehicles may be solved.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. An apparatus for locking a pickup unit of a disc player having a pickup unit supporting base plate resiliently mounted to a main chassis, the locking apparatus comprising:
   guide means for supporting and guiding said pickup means in an operative position for tracking said disc, said guide means having a first threaded portion for engaging a correspondingly threaded portion on said pickup means for driving said pickup means in a tracking manner and for moving said pickup means to a locked position;
   drive means for driving said guide means in a first rotational direction;
   a first locking lever slidably mounted to said base plate;
   a first locking means rotatably mounted to said base plate and operatively connected to said first locking lever;
   a second threaded portion on said guide means for engaging a correspondingly threaded portion on said first locking lever for driving said first locking lever in a first linear direction so as to urge said first locker into engagement with a first locking slot in said chassis.

2. The apparatus of claim 1 wherein said second set of threads is formed in a opposite operative direction from said first set of threads.

3. The apparatus of claim 1, further comprising:
   second and third locking means rototably mounted to said base plate and operatively connected to said second and third locking levers, respectively;
   second and third levers operatively connected to said first lever and to said second and third locking means for urging said second and third locking means into engagement with second and third openings in said chassis respectively during travel of said first lever in said first direction.

4. The apparatus of claim 3, further including:
   latching means pivotally connected to said first lever for operatively engaging said pickup unit when said pickup unit is moved to said locked position for holding said pickup unit and for preventing relative movement between said pickup unit and said guide means.

5. The apparatus of claim 4, further including:
   a second shoulder formed on said latching means for engaging said pickup unit shoulder opposite said first latching means shoulder to retain said pickup unit shoulder between said first and second latching means shoulders.

6. The apparatus of claim 4, further including:
   a stopper formed on said guide means between said first threaded portion and said second threaded portion, wherein said latching means secures said pickup unit against said stopper.

7. The device of claim 3, wherein:
   said second and third levers are pivotally mounted to said base plate and are pivoted in a first direction by said movement of said first lever in said first direction and are reversed pivoted in a second direction by movement of said first lever opposite said first direction.

8. The device of claim 7 wherein said second and third locking means are pivotally mounted to said base plate for rotation into and out of engagement with said openings in said chassis.

9. An apparatus for supporting a pickup unit mounted on main chassis of a disk player in a vehicle, comprising:
   a segment means for pivoting at a shoulder formed on a portion of a pickup unit movable along a threaded rod being driven by a motor mounted on a base plate;
   a first locking lever being moved by said pivotal segment and engaged with a driving threaded part formed at an end portion of the threaded rod;
   a second locking lever and a third locking lever in turn being interlocked by said first locking lever; and
   first, second and third locking means for engaging corresponding slots formed in a main chassis and interlocking with each of said first, second and third locking levers.

10. The apparatus as claimed in claim 9, further comprised of said first locking lever being provided with a threaded hole for engaging the driving threaded part, said driving threaded part being formed in the opposite direction opposite to the direction of threads of the threaded rod.

11. The apparatus as claimed in claim 9, further comprised of:
   a plurality of pins;
   each of said locking levers having end portions containing slots; and
   each of said first, second and third locking means being provided with a respective one of said plurality of pins fitted within the respective ones of slots of each of said levers.

* * * * *

UNITED STATES PATENT AND TRADEMARK OFFICE
CERTIFICATE OF CORRECTION

PATENT NO. : 5,023,862
DATED : June 11, 1991
INVENTOR(S) : Ko-Hyun Kim

It is certified that error appears in the above-indentified patent and that said Letters Patent is hereby corrected as shown below:

Column 6, Line 8, Preceding "slots", insert --said--:

Signed and Sealed this

Seventeenth Day of October, 1995

Attest:

BRUCE LEHMAN

Attesting Officer     Commissioner of Patents and Trademarks